United States Patent [19]

Vlasblom et al.

[11] Patent Number: 5,415,788
[45] Date of Patent: May 16, 1995

[54] LEATHER CLEANER AND CONDITIONER

[75] Inventors: Jack Vlasblom, Dunedin; Vincent A. Dotolo, Clearwater, both of Fla.

[73] Assignee: Citra Science Ltd., Largo, Fla.

[21] Appl. No.: 309,121

[22] Filed: Sep. 20, 1994

[51] Int. Cl.$^6$ .......................... C14C 11/00; B05D 7/12
[52] U.S. Cl. ................... 252/8.57; 8/94.1 R; 106/11; 134/42; 427/384; 427/389
[58] Field of Search ...................... 252/8.57; 8/94.1 R; 134/42; 427/384, 389; 106/11, 285

[56] References Cited

U.S. PATENT DOCUMENTS

| | | | |
|---|---|---|---|
| 2,283,540 | 5/1942 | Davis et al. | 252/8.57 |
| 3,656,881 | 4/1972 | Hemwall | 252/8.57 |
| 3,668,124 | 6/1972 | Cassella, Jr. | 252/8.57 |
| 4,158,543 | 6/1979 | Orlowski | 8/94.13 |
| 4,190,687 | 2/1980 | Sugiura et al. | 8/94.1 R |
| 4,285,688 | 8/1981 | Willis | 8/94.1 R |
| 4,554,083 | 11/1985 | Soldanski et al. | 252/8.57 |

FOREIGN PATENT DOCUMENTS

| | | |
|---|---|---|
| 1-174600 | 7/1989 | Japan . |
| 4-218600 | 8/1992 | Japan . |

*Primary Examiner*—Anthony Green
*Attorney, Agent, or Firm*—Donald R. Fraser

[57] ABSTRACT

A leather cleaner and conditioner consists of d-limonene, N-methyl-2-pyrrolidone, aliphatic dibasic acid ester, mineral oil, cetyl acetate, and butylated hydroxytoluene.

4 Claims, No Drawings

LEATHER CLEANER AND CONDITIONER

FIELD OF THE INVENTION

This invention relates generally to a leather cleaner and conditioner. More particularly, the invention is directed to a formulation and method for using a leather cleaner and conditioner containing, inter alia, d-limonene, which formulation is non-irritating to the user and is additionally biodegradable.

BACKGROUND OF THE INVENTION

Many commercial products are currently available for cleaning and conditioning leather articles such as, for example, saddles and bridles, clothing items, furniture coverings, automobile interiors, fashion accessories such as belts and handbags, and the like. Generally, such products incorporate an oil-based soap which is manually applied and worked into the leather with a brush, and thereafter rinsed with water. These soaps tend to be quite irritating to the skin of the user, and moreover, are not typically biodegradable. A more user and environmentally friendly leather cleaner and conditioner is needed.

It would be desirable to formulate a leather cleaner and conditioner which could be more easily applied to a leather article, would be non-toxic and non-irritating to the user, and which would be biodegradable.

SUMMARY OF THE INVENTION

Accordant with the present invention, a non-toxic, non-irritating, biodegradable leather cleaner and conditioner has surprisingly been discovered. It consists of d-limonene, N-methyl-2-pyrrolidone, aliphatic dibasic acid ester, mineral oil, cetyl acetate, and butylated hydroxytoluene.

The present invention additionally contemplates a method for cleaning and conditioning leather utilizing the aforementioned formulation.

The leather cleaner and conditioner of the present invention is particularly useful for cleaning and conditioning leather saddles and bridles.

DETAILED DESCRIPTION OF THE PREFERRED EMBODIMENTS

The leather cleaner and conditioner according to the present invention consists of a precise combination of d-limonene, N-methyl-2-pyrrolidone, aliphatic dibasic acid ester, mineral oil, cetyl acetate, and butylated hydroxytoluene.

D-limonene is a terpene which occurs naturally in all plants. It is a monocyclic unsaturated terpene which is generally a by-product of the citrus industry, derived from the distilled rind oils of oranges, grapefruits, lemons, and the like. A discussion regarding d-limonene and its derivation from numerous sources is set forth in Kesterson, J. W., "Florida Citrus Oil," Institute of Food and Agricultural Sciences, University of Florida, December, 1971. D-limonene is commercially available from Florida Chemical Company and from SMC Glidco Organics. D-limonene may be present in the inventive formulation at a concentration from about 19 to about 49 weight percent. Preferably, the concentration of d-limonene is about 31.8 weight percent.

N-methyl-2-pyrrolidone is a well-known compound, present in the inventive leather cleaner and conditioner as a dispersant. The N-methyl-2-pyrrolidone may be present at a concentration from about 20 to about 51 weight percent. Preferably, the concentration is about 31.95 weight percent.

Aliphatic dibasic acid ester according the present invention is a compound of the formula:

$$CH_3OOC(CH_2)_nCOOCH_3,$$

wherein "n" is a number from 1 to 5. Also contemplated by the term "aliphatic dibasic acid ester" is a mixture of these aliphatic dibasic acid esters. The aliphatic dibasic acid esters suitable for use according to the present invention include dimethyl malonate, dimethyl succinate, dimethyl glutarate, dimethyl adipate, dimethyl pimelate, and mixtures thereof. Aliphatic dibasic acid ester may be present at a concentration from about 0.5 to about 45 weight percent. Preferably, the concentration is about 30 weight percent. A preferred aliphatic dibasic acid ester is a mixture of dimethyl glutarate, dimethyl adipate, and dimethyl succinate available from DuPont Chemicals of Wilmington, Del. under the product designation "DBE-2".

The inventive leather cleaner and conditioner contains mineral oil, a well-known highly refined aliphatic- or aromatic-based colorless, tasteless, and odorless petroleum oil. The mineral oil may be present at a concentration from about 0.03 to about 1.05 weight percent. Preferably, the mineral oil concentration is about 1 weight percent. A preferred mineral oil may be obtained from Lyondell Petrochemical Company of Houston, Tex. under the product designation "DUO-PRIME OIL 90".

Cetyl acetate is a commercially available compound that is present in the inventive formulation as an emollient. The cetyl acetate may be present at a concentration from about 1.7 to about 8.5 weight percent. Preferably, the concentration is about 5 weight percent.

Butylated hydroxytoluene is present in the leather cleaner and conditioner as an antioxidant. The butylated hydroxytoluene may be present at a concentration from about 0.05 to about 5 weight percent. Preferably, the concentration is about 0.25 weight percent.

The ingredients of the leather cleaner and conditioner may be blended and mixed together in conventional mixing apparatus. The resultant formulation may then be utilized as a leather cleaner and conditioner by spraying or otherwise conventionally applying same to the surface of the leather to be cleaned and conditioned. Thereafter, the residue is merely wiped off the leather using a clean cloth. Thus, the leather is cleaned and conditioned.

EXAMPLE

The following ingredients are mixed together in the approximate weight percentages indicated, to prepare a leather cleaner and conditioner according to the present invention. Thereafter, the formulation is sprayed onto the surface of a leather article. The residue on the surface of the leather article is wiped off with a clean cloth. Thus, the leather article is cleaned and conditioned.

TABLE 1

| LEATHER CLEANER AND CONDITIONER | |
|---|---|
| Ingredient | Weight Percent |
| d-limonene (1) | 31.8 |
| N-methyl-2-pyrrolidone | 31.95 |
| aliphatic dibasic acid ester (2) | 30 |
| mineral oil (3) | 1 |
| cetyl acetate | 5 |

TABLE 1-continued

LEATHER CLEANER AND CONDITIONER

| Ingredient | Weight Percent |
|---|---|
| butylated hydroxytoluene | 0.25 |

(1) GLIDSAFE, from SCM Glidco Organics.
(2) DBE-2, from DuPont Chemicals.
(3) DUOPRIME OIL 90, from Lyondell Petrochemical Company.

This Example may be repeated with similar success by substituting the generically or specifically described ingredients and/or concentration recited herein for those used in the preceding Example.

From the foregoing description, one ordinarily skilled in the art can easily ascertain the essential characteristics of this invention and, without departing from its spirit or scope, can make various changes and modifications to adapt the invention to various uses and conditions.

What is claimed is:

1. A leather cleaner and conditioner composition, consisting of:
   from about 19 to about 49 weight percent d-limonene;
   from about 20 to about 51 weight percent N-methyl-2-pyrrolidone;
   from about 0.5 to about 45 weight percent aliphatic dibasic acid ester;
   from about 0.03 to about 1.05 weight percent mineral oil;
   from about 1.7 to about 8.5 weight percent cetyl acetate; and
   from about 0.05 to about 5 weight percent butylated hydroxytoluene.

2. A leather cleaner and conditioner composition, consisting of:
   about 31.8 weight percent d-limonene;
   about 31.95 weight percent N-methyl-2-pyrrolidone;
   about 30 weight percent aliphatic dibasic acid ester;
   about 1 weight percent mineral oil;
   about 5 weight percent cetyl acetate; and
   about 0.25 weight percent butylated hydroxytoluene.

3. A method for cleaning and conditioning leather, comprising applying to a surface of the leather a formulation consisting of:
   from about 19 to about 49 weight percent d-limonene;
   from about 20 to abut 51 weight percent N-methyl-2-pyrrolidone;
   from about 0.5 to about 45 weight percent aliphatic dibasic acid ester;
   from about 0.03 to about 1.05 weight percent mineral oil;
   from about 1.7 to about 8,5 weight percent cetyl acetate; and
   from about 0.05 to about 5 weight percent butylated hydroxytoluene.

4. A method for cleaning and conditioning leather, comprising applying to a surface of the leather a formulation consisting of:
   about 31.8 weight percent d-limonene;
   about 31.95 weight percent N-methyl-2-pyrrolidone;
   about 30 weight percent aliphatic dibasic acid ester;
   about 1 weight percent mineral oil;
   about 5 weight percent cetyl acetate; and
   about 0.25 weight percent butylated hydroxytoluene.

* * * * *